(12) United States Patent
Klaric et al.

(10) Patent No.: US 6,842,979 B2
(45) Date of Patent: Jan. 18, 2005

(54) METHOD OF PRODUCING A CYLINDER IN A TWO-CYCLE ENGINE

(75) Inventors: Igor Klaric, Korb (DE); Ralf Blechschmidt, Kernen (DE); Andreas Bähner, Weinstadt (DE); Matthias Hehnke, Schorndorf (DE); Christian Brüning, Backnang-Maubach (DE); Konrad Knaus, Gaildorf (DE); Jörg Schlossarczyk, Winnenden (DE); Peter Pretzsch, Schorndorf (DE); Rolf Sattelmaier, Waiblingen (DE); Jörg Jacubzig, Spiegelberg (DE)

(73) Assignee: Andreas Stihl AG & Co (DE)

( * ) Notice: Subject to any disclaimer, the term of this patent is extended or adjusted under 35 U.S.C. 154(b) by 50 days.

(21) Appl. No.: 10/305,615

(22) Filed: Nov. 26, 2002

(65) Prior Publication Data

US 2003/0097751 A1 May 29, 2003

(30) Foreign Application Priority Data

Nov. 28, 2001 (DE) ......................................... 101 58 397

(51) Int. Cl.⁷ ............................................. B25P 25/00
(52) U.S. Cl. ............................... 29/888.061; 29/527.2; 29/527.3; 29/527.4
(58) Field of Search ........................ 29/888.061, 527.1, 29/527.2, 527.3, 527.4; 123/73 PP, 73 AA, 73 AB, 73 C; 427/331

(56) References Cited

U.S. PATENT DOCUMENTS

| | | | |
|---|---|---|---|
| 4,700,444 A | 10/1987 | Yamagata | |
| 5,000,127 A | 3/1991 | Nishimura | |
| 5,050,547 A | * 9/1991 | Takahashi | ................ 123/193.2 |
| 5,934,239 A | * 8/1999 | Koriyama | ................ 123/193.2 |
| 6,101,991 A | 8/2000 | Glover | |
| 6,152,093 A | 11/2000 | Sawada et al. | |
| 6,298,811 B1 | 10/2001 | Sawada et al. | |

FOREIGN PATENT DOCUMENTS

| | | |
|---|---|---|
| JP | 63-293151 | 11/1988 |
| JP | 03-134251 | 6/1991 |
| JP | 06-159131 | 6/1994 |

OTHER PUBLICATIONS

JPO Machine English Language Translation of JP 06–159131. Japanese Patent Office.*

* cited by examiner

Primary Examiner—Eric Compton
(74) Attorney, Agent, or Firm—R W Becker & Associates; R W Becker

(57) ABSTRACT

A method is provided for producing a cylinder in a two-cycle engine. The cylinder bore is first machined as a preparation for the provision of a coating. The thereby resulting window edges that surround an inlet window are then at least partially chamfered. The cylinder bore is consequently provided with the coating, which at least partially overlaps the chamfered window edge. There thereby results in the region of the window edge a location of least spacing relative to the axis of the transfer channel. The piston liner or gliding surface is finally machined to a finished dimension such that in the region of the chamfered and coated window edge or corner there is formed a coating edge having a wall spacing relative to the location of least spacing, which such wall spacing having a maximum value of 0.7 mm.

8 Claims, 4 Drawing Sheets

METHOD OF PRODUCING A CYLINDER IN A TWO-CYCLE ENGINE

BACKGROUND OF THE INVENTION

The present invention relates to a method of producing a cylinder in a two-cycle engine, especially a drive engine for a manually-guided implement such as, for example, a chain saw a brush cutter, a trimmer or the like.

Known two-cycle engines have a cylinder with a cylinder bore for receiving a piston. To reduce the wear of the movable parts, and to improve the operating characteristics, the inner side of the cylinder bore is provided with a coating, for example of chromium or nickel, with the surface of the coating forming a hardened piston gliding surface for the piston. Fresh gas from a fuel/air mixture is conveyed via at least one transfer channel into the inner chamber of the cylinder, whereby the transfer channel opens into the piston-gliding surface via an inlet window. The inlet window, relative to its geometrical design and its relative disposition in the piston-gliding surface, is arranged in such a way that the piston, by means of its reciprocating movement, opens or closes the inlet window at prescribed times. In this connection, the piston skirt of the piston cooperates with the inlet window as a slide control for that time interval during which fresh gas is conveyed into the inner chamber of the cylinder.

To achieve a high engine power, a high efficiency, and low exhaust gas values, it is necessary, in addition to having a precise disposition of the control times, to also have a precisely oriented guidance of flow through the inlet window that is as low in loss as possible. In this connection, the configuration of the window edges that surround the inlet window is of great significance. The fresh gas that flows in, in addition to filling the inner chamber of the cylinder, also has the task of pressing the exhaust gas, which resulted in a previous operating cycle, out of the inner chamber of the cylinder through an outlet channel. By means of a precisely oriented guidance of the fresh gas stream, the inner chamber of the cylinder should likewise be filled as much as possible with fresh gas, and the exhaust gas should be pressed out as completely as possible. In this connection, it is desired to keep scavenging losses due to fresh gas escaping together with the exhaust gas as low as possible. A sharp-edged configuration of the window edges is desired for a guidance of the flow that is as undisturbed as possible. Imprecisions in the configuration of the window edges can lead to an undesired turbulence or erroneous guidance of the fresh gas stream, as a result of which the operating characteristics of the internal combustion engine, and in particular the exhaust gas values that can be achieved, can be influenced in a disadvantageous manner.

Cylinders of the aforementioned type are conventionally produced from a light metal casting in which the transfer channels are cast. Introduced into the casting is a piston bore, the surface of which is machined for the subsequent application of a coating. In so doing, a sharp peripheral edge results at the inlet window. The surface of the cylinder bore is subsequently provided with a coating, for example of chromium or nickel, and is finished to size, especially by honing, for the piston that is later to be placed in the bore.

During the honing of the piston liner, or during deburring of the window edge, a portion of the coating can break away in the region of the window edge. The resulting imprecisions lead to a disadvantageous influencing of the guidance of the fresh gas stream, and hence to an impairment of the operating characteristics of the engine, and of the exhaust gas values that can be achieved.

It is therefore an object of the present invention to provide a method of producing a cylinder in a two-cycle engine by means of which a reliable and improved guidance of fresh air in the finished cylinder is ensured in conformity with the structurally prescribed design.

BRIEF DESCRIPTION OF THE DRAWINGS

This object, and other objects and advantages of the present invention, will appear more clearly from the following specification in conjunction with accompanying schematic drawings, in which.

SUMMARY OF THE INVENTION

Figure 1:
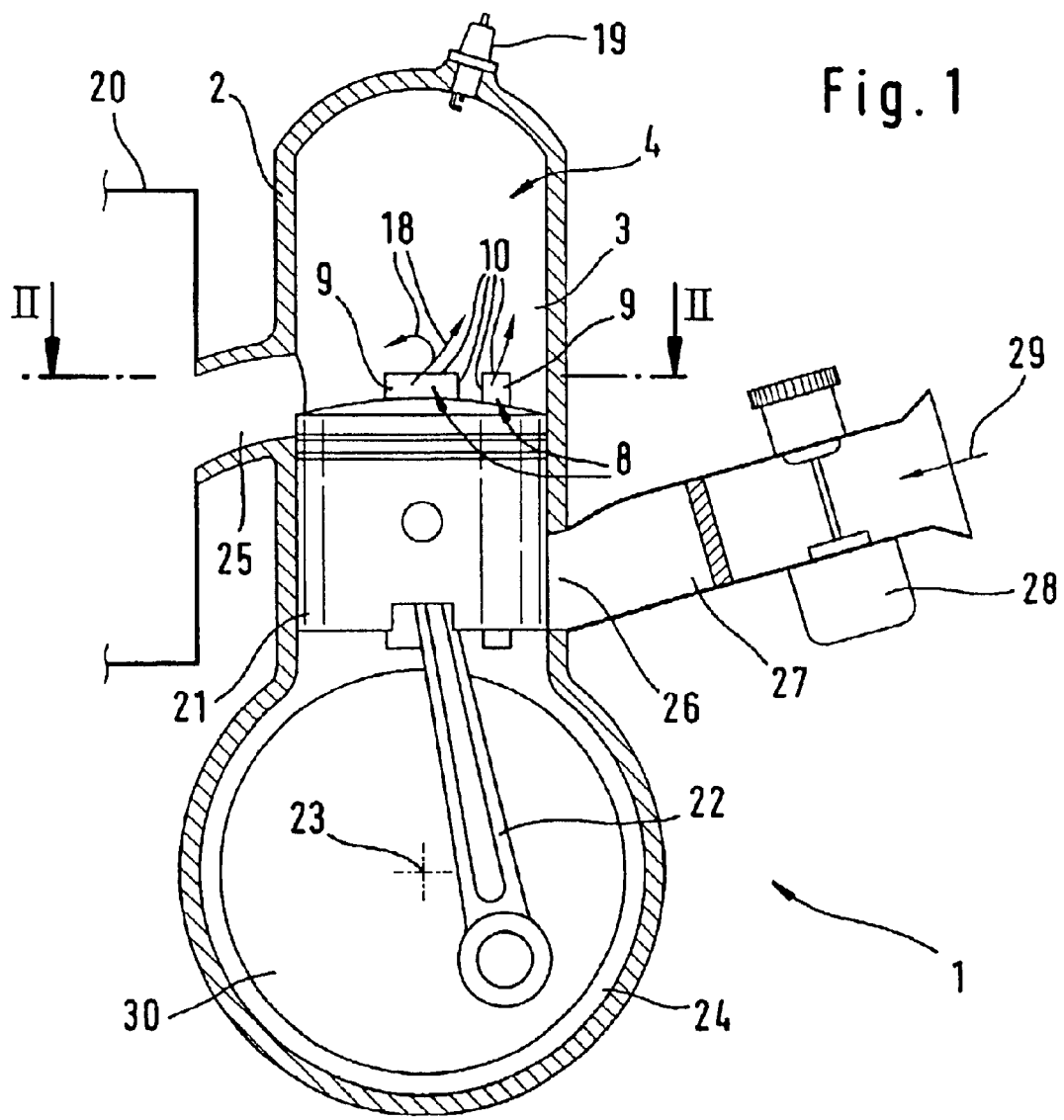
FIG. 1 is a diagrammatic longitudinal cross-section through a two-cycle engine and its essential components.

The object of the present invention is realized by a method of producing a cylinder in a two-cycle engine, wherein the cylinder has an inner chamber that is delimited by a cylindrical piston gliding surface formed by a coating provided on an inwardly directed surface of a bore of the cylinder, and wherein at least one transfer channel is provided that opens into the inner chamber of the cylinder via an inlet window disposed in the piston gliding surface.

Pursuant to the present invention, it is proposed to first mechanically machine the cylinder bore as a preparation for the provision or application of the coating. The thereby resulting sharp window edges that surround the inlet window are subsequently at least partially broken away or chamfered, and the coating is then provided or applied to the surface of the cylinder bore and at least partially also on the chamfered window edges. As a consequence of the chamfered edge or corner, there results between the coating and the window edge a laminar connection, as a result of which the adhesion of the coating is considerably improved and hence the insensitivity to breaking away of the coating in this region is considerably increased. The chamfered window edge further leads to a formation of the coating in this region with a rounded cross-section, whereby in the region of the window edge there results a location of least spacing relative to the axis of the transfer channel. The coating, which is rounded in the region of the window edge, is considerably less sensitive to the stresses that occur during the later machining of the piston liner or gliding surface to the finished dimension, for example by honing. A breaking away of the coating in the region of the window edge can thereby be reliably avoided.

It has been surprisingly shown that by maintaining certain geometrical parameters, the rounded window edges that result from the coating have an advantageous effect upon the guidance of the fresh gas in this region during operation of the two-cycle engine. For this purpose, the piston liner is machined to a finished dimension in such a way that a coating edge is formed in the region of the chamfered and coated window edge. In the region of the inlet window, the coating edge has a wall spacing relative to the location of least spacing relative to the channel axis. By coordinating the coating thickness and the honing process, this wall spacing can be established such that it has a maximum value of 0.7 mm or less. As was surprisingly discovered, an undisturbed guidance of flow of the fresh gas resulted in conformity with the structurally prescribed design in this value range.

Pursuant to one advantageous further embodiment of the invention, the coating process and the machining of the surface of the coating are adjusted relative to one another such that the coating edge has, relative to the location of least spacing relative to the channel axis, in the region of the inlet window, a radial spacing having a maximum value of 0.8 mm or less. In this connection, the radial spacing is measured in a radial direction relative to the cylinder axis. Also in this value range one observes an undisturbed guidance of the flow of the fresh gas out of the inlet window into the inner chamber of the cylinder. In this connection, the wall spacing and the radial spacing are expediently coordinated with one another, whereby with a wall spacing at or near its maximum value, the radial spacing is low, possibly approximately zero. Conversely, with a radial spacing at or near its maximum value, the wall spacing is set to be approximately zero. Maximum permissible intermediate values are expediently formed by a functional interrelationship between the radial spacing and the wall spacing, whereby in the aforementioned permissible value range the maximum permissible radial spacing drops linearly relative to an increasing wall spacing. Consequently, a wide value pair range results in which one can expect an undisturbed guidance of the flow of the fresh gas. At the same time, the designer thereby has a high degree of structural freedom within which he or she can coordinate the radial spacing and the wall spacing, and can also take into account manufacturing requirements. Taking into account the permissible value pairs, a well rounded configuration of the coated window edge or corner can thereby be achieved that is not only insensitive to stresses during the manufacturing process, but is also insensitive to thermal stresses during operation of the internal combustion engine.

Pursuant to an expedient further embodiment of the inventive method, the coating is embodied in the region of the chamfered window corner in such a way that it does not project to any considerable extent in the radial direction, as related to the axis of the transfer channel, relative to an uncoated channel wall section that is disposed further inwardly. As a result, also in the region of its inlet window the transfer channel has a low resistance to flow, as a consequence of which the efficiency of the internal combustion engine, and also the exhaust gas quality, are positively influenced.

It can also be expedient to draw the coating into the transfer channel, as a result of which on the whole the adhesion of the coating is improved in the region of the window corner. A narrowing of the cross-section of the transfer channel that may be formed thereby does not have a disadvantageous influence upon the flow quality if the maximum narrowing of the cross-section is not greater than 0.03 mm and if between the narrowest location and the location of least radial spacing relative to the channel axis in the region of the inlet window there remains a linear section having a length of at least 0.2 mm.

Further specific features of the present invention will be described in detail subsequently.

DESCRIPTION OF PREFERRED EMBODIMENTS

Referring now to the drawings in detail, FIG. 1, in a schematic overall illustration, shows the essential elements of a two-cycle engine 1 having a cylinder 2 in which a piston 21 is longitudinally displaceably guided in a reciprocating manner. By means of a connecting rod 22, the piston 21 drives a crankshaft 30 that is rotatably mounted in a crankcase 24 about a crankshaft axis 23. Depending upon the stroke movement of the piston 21, an intake window 26 is exposed or closed-off by the piston 21. By means of the pressure fluctuation that results in the crankcase 24 via the reciprocating movement of the piston 21, fresh air is drawn in in the direction of the arrow 29 via the intake window 26, an intake channel 27, and a carburetor 28; in the carburetor 28, a fuel/air mixture is prepared with the fresh air. The fuel/air mixture passes through the intake window 26 and from there, as a function of the position of the piston 21, passes through a number of transfer channels 8 into a combustion or inner chamber 4 that is surrounded by the cylinder 2. The fuel/air mixture that is in the inner chamber 4 of the cylinder 2 can be ignited by a spark plug 19 in the vicinity of the upper dead center position of the piston 21.

By means of inlet windows 9, which are delimited by window edges 10, the transfer channels 8 open into a gliding surface or liner 3 upon which the piston 21 glides. The window edges 10 and the geometrical configuration of the transfer channels 8 and their inlet windows 9 are designed in such a way that when the fuel/air mixture flows in in the direction of the arrows 18, the exhaust gas that results from the preceding combustion cycle, and, which is disposed in the inner chamber 4 of the cylinder, is pressed through an outlet channel 25 into an indicated exhaust muffler 20, and from there into the atmosphere. Depending upon the rotational position of the crankshaft 30, and hence the accompanying position of the piston 21 relative to the inlet windows 9, control times are prescribed in which the fuel/air mixture passes into the inner chamber 4 of the cylinder 2.

Figure 2:
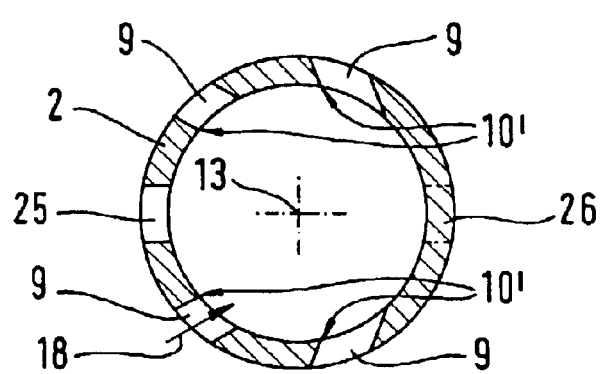
FIG. 2 is a cross-sectional illustration through the cylinder of a two-cycle engine taken along line II—II in FIG. 1 to show the principle of operation.

FIG. 2 shows a schematic cross-sectional illustration of the cylinder 2 of FIG. 1 with a total of four inlet windows 9 as well as the indicated intake window 26 and the outlet channel 25. The transfer channels 8 (FIG. 1) and the inlet windows 9 are oriented in such a way that the direction of introduction of the fuel/air mixture, as indicated by the arrow 18, faces approximately in the direction of a central cylinder axis 13 or upon that side thereof that is opposite the outlet channel 25. As a consequence of this orientation, there results acute-angled window corners 10', the corner angles of which are less than 90°. The inventive method is preferably used at these acute-angled corners 10', but can also be expedient at any other window edge 10.

Figure 3:
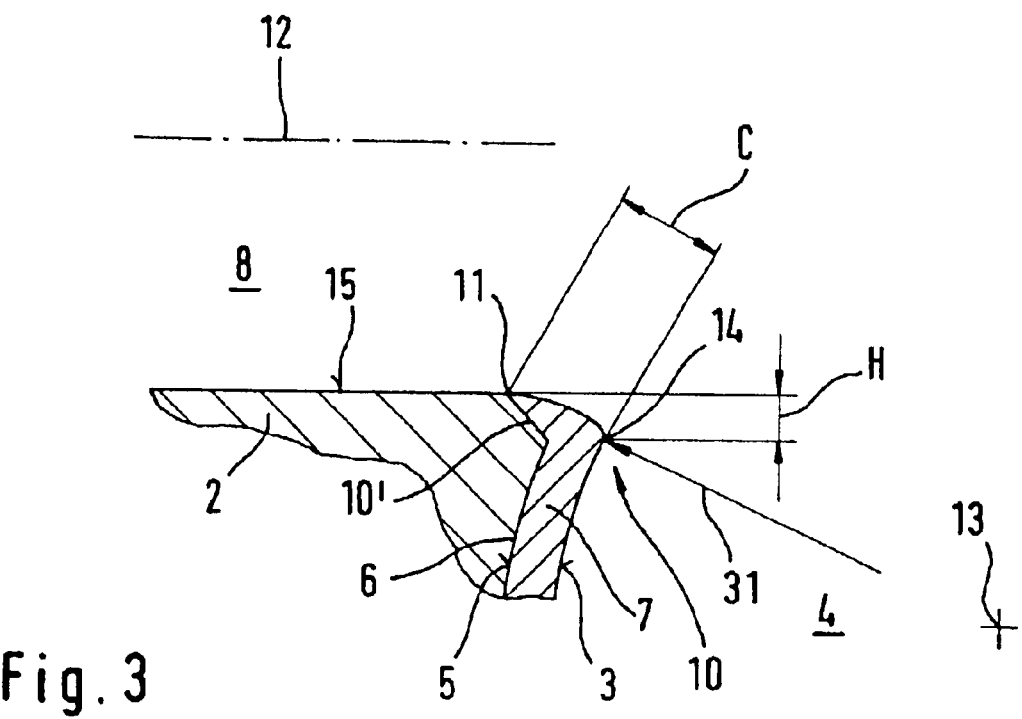
FIG. 3 is an enlargement of a coated and rounded window edge having a channel cross-section that is not narrowed.

In a schematic sectional enlargement, FIG. 3 shows the cylinder 2 of FIG. 2 in the region of a window corner 10'. The window corner 10' is broken or chamfered; the transfer channel 8, which extends along a channel axis 12, opens at the window corner 10' into the inner chamber 4 of the cylinder 2. The inner chamber 4 is delimited by a cylinder bore 6, upon the surface 5 of which is applied a coating 7 of chromium, nickel or some other suitable hard material. To finish this arrangement, the cylinder bore 6, in the form of a cast blank or casting of light metal, is first introduced into the cylinder 2, and the surface 5 of the cylinder bore 6 is worked or machined in such a way that the coating 7 can be applied. The sharp window corner toward the transfer channel 8 that results during the machining of the surface 5 is chamfered to form a window corner 10' so that a bevel results. The coating 7 is subsequently applied to the surface 5 of the cylinder bore 6 and upon the chamfered corner 10', whereby in the region of the chamfered corner 10' a rounded cross-section is obtained in the coating 7. In this connection, in the region of the chamfered window corner 10' a location 11 of least spacing relative to the channel axis 12 of the transfer channel 8 is formed, whereby in the illustrated embodiment this location 11 does not project significantly beyond an uncoated channel wall 15 of the transfer channel 8. As a result, the transfer channel 8 has no noticeable narrowing of its cross-sectional area along the axis 12 of the channel.

In a subsequent working step, a gliding surface 3 is formed of the piston 21 (see FIG. 1) by honing the coating 7, as a consequence of which there results a coating edge 14 in the coating 7 in the region of the window corner 10'.

The location 11 and the coating edge 14 have, with reference to the channel axis 12, a wall spacing H relative to one another, and with reference to the radial direction, as indicated by the arrow 31, have a radial spacing C relative to one another and with reference to the cylinder axis 13. In the illustrated embodiment, the radial spacing C is 0.4 mm, and the wall spacing H is 0.35 mm. The radial spacing C can be set to a maximum of 0.8 mm, whereby the wall spacing H is to be kept low. It is also possible to set the wall spacing H to a maximum of 0.7 mm, whereby the radial spacing C is to be kept low. Pairing of the values of the radial spacing C and of the wall spacing H can also be set, whereby the maximum permissible value of the radial spacing C is a function of the selected wall spacing H and extends linearly between the aforementioned threshold values. Smaller values of the radial spacing C and of the wall spacing H could also be expedient.

In the illustrated embodiment, the cylinder 2 is a light metal cast block, in the cylinder bore 6 of which the coating 7 is directly applied. The inventive method can also be used with cylinders 2 that have a separate liner for the piston 21.

Figure 4:
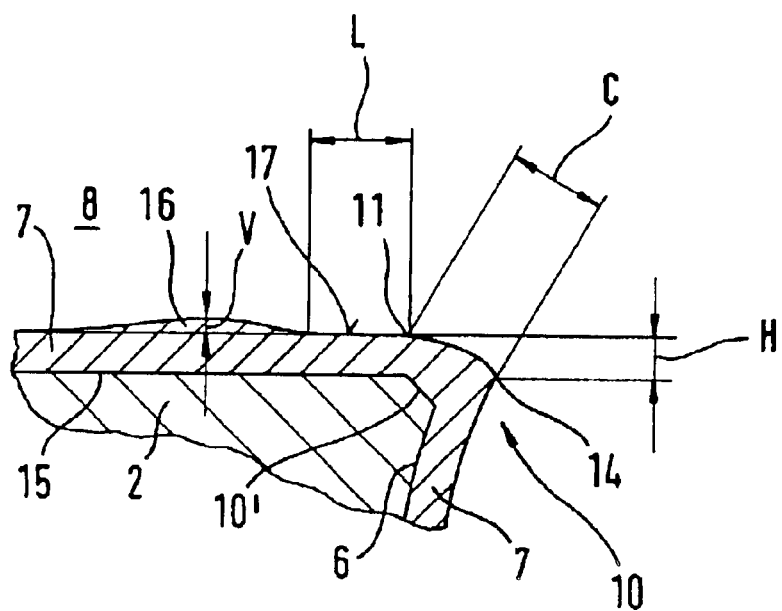
FIG. 4 is a variation of the embodiment of FIG. 3 having a coating that is drawn into the transfer channel, with a narrowing of the channel being formed.

FIG. 4 shows a variation of the arrangement of FIG. 3, according to which the coating 7 is drawn along the channel wall 15 into the transfer channel 8. In this connection, a narrowed location 16 having a maximum narrowing V of the cross-sectional area of the transfer channel 8 is formed. Remaining between the narrowed location 16 and the location 11 is a linear section 17 having a length L. The maximum permissible narrowing V is 0.03 mm, whereby the minimum value of the length L is 0.2 mm. The remaining features and reference numerals correspond with those of the embodiment of FIG. 3.

Figure 5:
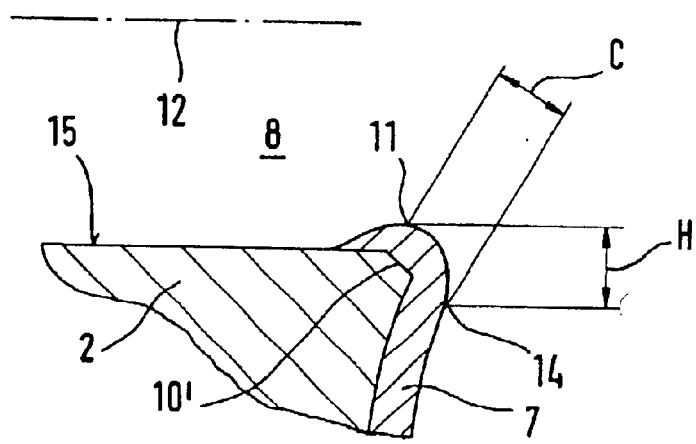
FIG. 5 shows a window edge having a coating bead that projects into the transfer channel.

In the embodiment illustrated in FIG. 5, the coating 7, about the chamfered window edge 10, is drawn slightly into the transfer channel 8. The rest of the channel wall 15 remains uncoated. In this connection, in the region of the window edge 10 the coating 7 extends into the transfer channel 8, as a consequence of which the cross-sectional area of the transfer channel 8 at the location 11 of the least spacing relative to the channel axis 12 is narrowed relative to the uncoated region of the channel wall 15. During honing of the coating 7, an obtuse-angle coating edge 14 is formed that is disposed at a greater radial spacing relative to the channel axis 12 than is the uncoated channel wall 15. The coating edge 14 can also have a rounded configuration. The same limits as previously described apply to the values of the radial spacing C and the wall spacing H.

Figure 6:
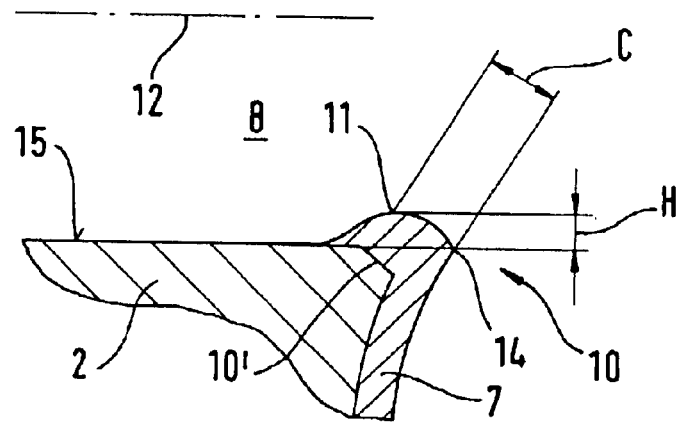
FIG. 6 is a variation of the arrangement of FIG. 5 having a sharp-edged coating edge.

A variation of the arrangement of FIG. 5 is shown in FIG. 6, where relative to the channel axis 12 the coating edge 14 is disposed approximately at the level of the uncoated channel wall 15. The resulting sharp-edge coating edge 14 can also be subsequently rounded or chamfered.

Figure 7:
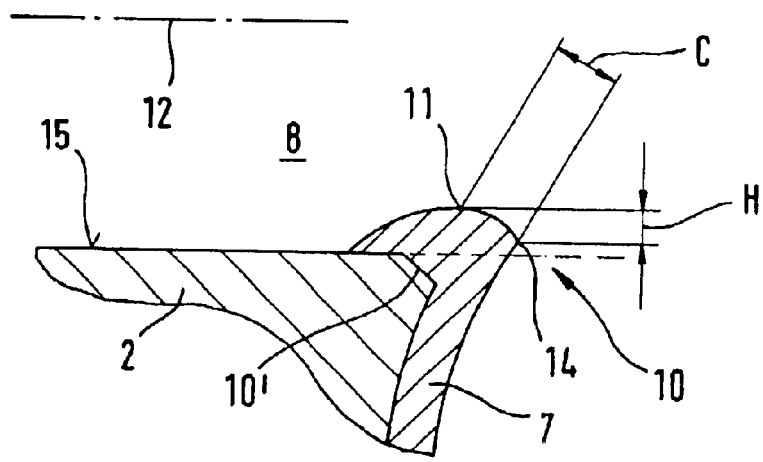
FIG. 7 is a further variation of the arrangements of FIGS. 5 and 6 having a coating edge that is drawn inwardly beyond the channel wall.

A further variation of the embodiments of FIGS. 5 and 6 is shown in FIG. 7, where relative to the channel axis 12 the coating edge 14 is disposed radially inwardly relative to the uncoated channel wall 15. In other features and reference numerals, the embodiments of FIGS. 5 to 7 correspond to those of the embodiments of FIGS. 3 and 4.

Figure 8:
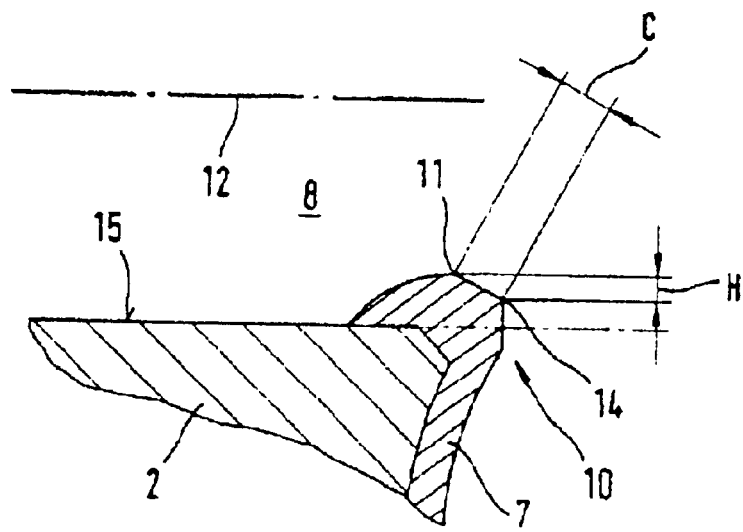
FIG. 8 is a variation of the arrangement of FIG. 7.

A further embodiment as a variation of FIG. 7 is illustrated in FIG. 8. Here, the contour of the window edge 10 is similarly comprised of two sections having planar surface that are disposed at a specified position relative to one another. With such an arrangement, the coating edge 14 is defined as the line formed by the intersection of the two surfaces. In this connection, C denotes the radial spacing between the location 11 and the coating edge 14, while the wall spacing H, which results relative to the channel axis 12, is defined by the respective planes in the location 11 and the edge 14.

Figure 9:
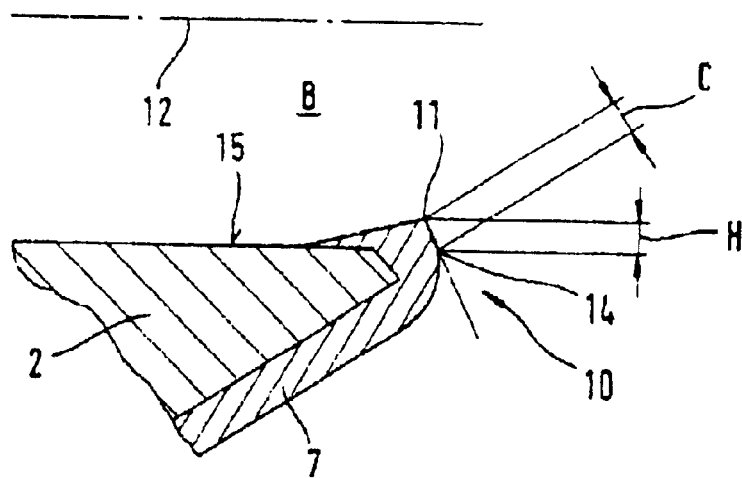
FIG. 9 is a further embodiment having a curved contour relative to the gliding surface.

FIG. 9 illustrates an embodiment where the contour is formed from a radially planar section and an adjoining curved section. The planar section proceeds from the location 11 up to the coating edge 14, which forms the beginning of the curve or arc. The definition of the radial spacing C and of the wall spacing H coincides with that of FIG. 8. The same reference numerals were used for the same components as in the previous figures.

The specification incorporates by reference the disclosure of German priority document 101 58 397.4 filed Nov. 28, 2001.

The present invention is, of course, in no way restricted to the specific disclosure of the specification and drawings, but also encompasses any modifications within the scope of the appended claims.

We claim:

1. A method of producing a cylinder in a two-cycle engine, wherein said cylinder has an inner chamber that is delimited by a cylindrical piston gliding surface formed by a coating provided on an inwardly directed surface of a bore of said cylinder, and wherein at least one transfer channel is provided that opens into said inner chamber of said cylinder via an inlet window disposed in said piston gliding surface, said method including the steps of:

mechanically machining said surface of said cylinder bore as a preparation for provision of said coating, wherein said machining results in window edges that surround said inlet window;

at least partially machining said window edges such that a chamfered window corner results;

subsequently providing said surface of said cylinder bore with said coating, wherein said coating at least partially overlaps said chamfered window corner, and wherein in a region of said window corner there results a location of least spacing relative to a channel axis of said at least one transfer channel; and to form said piston gliding surface, machining said coating to a finished dimension such that in the region of said chamfered and at least partially coated window corner there is formed a coating edge having a wall spacing H relative to said location of least spacing, wherein said wall spacing has a maximum value of 0.7 mm.

2. A method according to claim 1, wherein said step of providing said coating, and said subsequent step of machining said coating, are coordinated with one another in such a way that said coating edge has, relative to said location of the spacing, in a radial direction as related to an axis of said cylinder, a radial spacing C having a maximum value of 0.8 mm.

3. A method according to claim 2, wherein if said wall spacing H has a value at or near its maximum value, said radial spacing C has a value lower than its maximum value, and wherein if said radial spacing C has a value at or near its maximum value, said wall spacing H has a value lower than its maximum value.

4. A method according to claim 3, wherein said radial spacing C and said wall spacing H form a value pair, whereby a maximum permissible radial spacing becomes lower as a linear function relative to an increasing wall spacing H.

5. A method according to claim 1, wherein in the region of said chamfered window corner said coating is embodied such that, relative to an uncoated channel wall portion, said coating does not project appreciably in a radial direction relative to said channel axis.

6. A method according to claim 1, wherein said coating is drawn into said at least one transfer channel.

7. A method according to claim 6, wherein in said at least one transfer channel said coating is embodied such that a narrowed location is formed that does not exceed a maximum narrowing of a cross-section of said transfer channel by 0.03 mm, and wherein between said narrowed location and said location of least spacing there remains a linear section having a length of at least 0.2 mm.

8. A method according to claim 3, wherein if said wall spacing H has a value at or near its maximum value, said radial spacing C is at least approximately zero, and wherein if said radial spacing C has a value at or near its maximum value, said wall spacing H is at least approximately zero.

* * * * *